US011835472B2

United States Patent
Sun et al.

(10) Patent No.: US 11,835,472 B2
(45) Date of Patent: Dec. 5, 2023

(54) DEVICE AND METHOD FOR DETECTING SUBSURFACE DEFECT OF OPTICAL COMPONENT

(71) Applicant: ZHEJIANG UNIVERSITY, Hangzhou (CN)

(72) Inventors: Anyu Sun, Hangzhou (CN); Bingfeng Ju, Hangzhou (CN); Kaimin Guan, Hangzhou (CN); Li Zheng, Hangzhou (CN); Haoze Zhong, Hangzhou (CN); Yuanliu Chen, Hangzhou (CN); Wule Zhu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/939,768

(22) Filed: Sep. 7, 2022

(65) Prior Publication Data
US 2023/0044124 A1     Feb. 9, 2023

Related U.S. Application Data

(63) Continuation of application No. PCT/CN2021/113478, filed on Aug. 19, 2021.

(51) Int. Cl.
*G01N 21/958*    (2006.01)
(52) U.S. Cl.
CPC ..... *G01N 21/958* (2013.01); *G01N 2201/062* (2013.01); *G01N 2201/068* (2013.01);
(Continued)

(58) Field of Classification Search
CPC ....... G01N 21/958; G01N 2201/06113; G01N 2201/062; G01N 2201/068; G01N 2201/084
(Continued)

(56) References Cited

FOREIGN PATENT DOCUMENTS

| CN | 104568982 A | 4/2015 |
|----|-------------|--------|
| CN | 107144217 A | 9/2017 |

(Continued)

OTHER PUBLICATIONS

Chen Ting et al., "Application of spectral confocal technique in precise geometric measurement", Metrology and Measurement Technology, Aug. 4, 2015, pp. 4-5.
(Continued)

*Primary Examiner* — Tri T Ton

(57) ABSTRACT

Disclosed are a device and method for detecting a subsurface defect of an optical component. According to the device and method, a spectral confocal technology, a laser scattering technology and a laser-induced ultrasonic technology are combined, excitation laser and detection laser are simultaneously focused to different depths of the optical component through a dispersion lens set, the excitation laser generates a transient thermal expansion effect on a subsurface of the optical component, the detection laser is used for observing and analyzing ultrasonic vibration of the subsurface defect under an action of the thermal expansion effect, and spatial distribution information and scattered spectral information of scattered light at a position of the subsurface defect are acquired by the spectral confocal technology. The device and method are suitable for nondestructive testing of a finished product of an ultra-precise optical component with a strict requirement on the subsurface defect.

6 Claims, 6 Drawing Sheets

(52) U.S. Cl.
CPC .............. *G01N 2201/06113* (2013.01); *G01N 2201/084* (2013.01)

(58) Field of Classification Search
USPC ...................... 356/237.1–237.6, 239.1–239.8
See application file for complete search history.

(56) References Cited

FOREIGN PATENT DOCUMENTS

| | | |
|---|---|---|
| CN | 109668838 A | 4/2019 |
| CN | 109916909 A | 6/2019 |

OTHER PUBLICATIONS

RJ Dewhurst, "Through-Transmission Ultrasonic-Imaging of Subsurface Defects Using Noncontact Laser Techniques", Optics & Lasers in Engineering, Jan. 1, 1992.

DEVICE AND METHOD FOR DETECTING SUBSURFACE DEFECT OF OPTICAL COMPONENT

CROSS-REFERENCE TO RELATED APPLICATIONS

This application is a continuation of International Patent Application No. PCT/CN2021/113478 with a filing date of Aug. 19, 2021, designating the United States, now pending, and further claims priority to Chinese Patent Application No. 202110896661.7 with a filing date of Aug. 5, 2021. The content of the aforementioned applications, including any intervening amendments thereto, are incorporated herein by reference.

TECHNICAL FIELD

The present invention relates to a precision testing technology, and particularly to a device and method for detecting a subsurface defect of an ultra-precision optical component. The present invention may be applied to quality detection of a precise optical component, and is particularly suitable for detection of a finished product of a high value-added ultra-precision optical component with a strict requirement on a subsurface defect.

BACKGROUND

High-precision optical components are manufactured by ultra-precision cutting, ultra-precision grinding, ultra-precision polishing and other processing methods, and different processing methods may bring in different subsurface defects. For example, during ultra-precision cutting of brittle materials such as silicon and germanium, material extrusion and phase change, lattice slip and dislocation, and other phenomena are easy to occur due to a comprehensive influence of inherent characteristics such as a high hardness, a low toughness and an easy brittle fracture, a scale effect and a crystal anisotropy, resulting in a subsurface damage. Specifically, the subsurface damage is manifested as the subsurface defects such as a micro-nano scale fracture, a crack, a dislocation and a twin structures, and has a scale as large as several microns and hundreds of nanometers, and as small as tens or even several nanometers. The ultra-precision polishing can reduce residual surface cracks generated during the ultra-precision cutting and the ultra-precision grinding to a certain extent, but under a multi-field coupling effect of force, heat, flow and chemistry, a purity and chemical state of abrasive particles in a polishing solution, a microdynamic load of the abrasive particles and the like may also directly affect a subsurface quality of a polished piece, resulting in new nano-scale subsurface defects such as a nano-particle residue, polishing atomization and a micro-nano plastic crack.

The above-mentioned subsurface defects have the characteristics of small scale, complex morphology and large difference in physical property, and different micro-subsurface defects will induce different macro-damages. It is an insurmountable problem and challenge for quality control of a high-precision optical component to detect and identify different types of subsurface defects. Meanwhile, accurate detection of the subsurface damage is a basis of removing the subsurface damage, and is also an inevitable requirement of studying a formation mechanism of the damage and optimizing processing parameters. Therefore, it is of great significance to detect and study the subsurface defect of the optical component. In recent years, subsurface defect detection is a high-frequency vocabulary in a technical negotiation between an entrusting party and an entrusted party, and has also become a "flaming mountain" that optical cold machining enterprises in China cannot get around when going to an international leading level. A capability and level of the subsurface defect detection will also be one of key factors that determine a breadth and depth of market competition of machining entities. Therefore, it is also an urgent requirement for industrial technology upgrading of related enterprises in China to carry out research on the subsurface defect of the optical component.

SUMMARY

A subsurface defect of an optical component is a key factor affecting an optical performance and a service life of the optical component. At present, subsurface defect detection methods have their own emphases, but on the whole, the methods still cannot meet a requirement of nondestructive testing of an ultra-precision optical component in three aspects of positioning, sensitivity and physical property detection. The present invention aims to provide a nondestructive testing technology for a subsurface defect of an optical component.

In order to achieve the above object, the technical solutions used in the present invention are as follows.

A device for detecting a subsurface defect of an optical component comprises a wide-spectrum light source, an excitation laser device, a detection laser device, a dispersion lens set, a spectrum detection device, a laser interference detection device, an optical fiber optical path system, a motion platform and a main control system.

The wide-spectrum light source generates white light, the excitation laser device generates excitation laser, and the detection laser device generates detection laser; the white light, the excitation laser and the detection laser are coupled into the dispersion lens set through the optical fiber optical path system; the dispersion lens set focuses the white light, the excitation laser and the detection laser to different depths of the optical component; the spectrum detection device is used for detecting spectrum distribution information of reflected light and scattered light; the excitation laser generates a transient thermal expansion effect on a subsurface of the optical component; the laser interference detection device is used for observing and recording ultrasonic vibration induced by the excitation laser, and composed of a Fabry-Perot resonator, a dichroic lens, an interference photoelectric detector and an interference signal sampler; and the motion platform is capable of driving the optical component to be detected or the dispersion lens set to move in a three-dimensional space of X, Y and Z, and scanning and detecting a surface and a subsurface of a sample to be detected through the main control system.

Further, the wide-spectrum light source in the device is a white light LED point light source used for generating continuous wide-spectrum white light; the excitation laser device is a near infrared laser device, a wavelength of the excitation laser preferably ranges from 1,000 nanometers to 1,800 nanometers, and a time domain width of a minimum pulse is less than 1,000 picoseconds; and the detection laser device generates continuous detection laser, and a wavelength of the detection laser preferably ranges from 480 nanometers to 600 nanometers, and is most preferably 545 nanometers.

Further, the dispersion lens set in the device is capable of respectively focusing polychromatic light and generating axial dispersion, with a numerical aperture larger than 0.6; and through the dispersion lens set, the detection laser and the excitation laser are respectively focused at different axial positions, and a distance between the axial positions of the detection laser and the excitation laser preferably ranges from 90 microns to 150 microns, and is most preferably 120 microns.

Further, the optical fiber optical path system in the device comprises a dual-mode optical fiber, a Y-shaped optical fiber coupler, a 1×2 optical switch, a first visible light optical fiber, a second visible light optical fiber, a third visible light optical fiber, a fourth visible light optical fiber and an optical fiber beam collector.

The dual-mode optical fiber is composed of an infrared annular multi-core optical fiber and a visible light multi-core optical fiber, and the infrared multi-core optical fiber surrounds on an outer side of the visible light multi-core optical fiber; the visible light multi-core optical fiber is provided with an odd number of fiber cores, a central fiber core is located in a geometric center of the visible light multi-core optical fiber, and a diameter of the central fiber core is more than three times that of other fiber cores; the 1×2 optical switch is provided with three ports comprising a port P1, a port P2 and a port P3, which are respectively connected with one ends of the first visible light optical fiber, the second visible light optical fiber and the third visible light optical fiber, and the port P1 is only communicated with one of the port P2 and the port P3 at the same time; the Y-shaped optical fiber coupler is provided with three ports comprising a light inlet, a light outlet and a coupling port; the other end of the first visible light optical fiber is connected to the light inlet of the Y-shaped optical fiber coupler; one end of the fourth visible light optical fiber is connected to the light outlet of the Y-shaped optical fiber coupler, and the other end of the fourth visible light optical fiber is connected to an intermediate node of the optical fiber beam collector; the central fiber core of the visible light multi-core optical fiber is connected to the coupling port of the Y-shaped optical fiber coupler; the white light generated by the wide-spectrum light source enters the port P2 of the 1×2 optical switch through the second visible light optical fiber; the detection laser generated by the detection laser device passes through the laser interference detection device and then enters the port P3 of the 1×2 optical switch through the third visible light optical fiber; and the optical fiber beam collector is provided with an odd number of nodes arranged in a linear array, wherein the number of nodes is the same as the number of cores of the visible light multi-core optical fiber, and used for collecting the fiber cores of the visible light multi-core optical fiber into the linear array.

Further, the spectrum detection device in the device comprises a first lens, a second lens, a grating optical splitter, a photodetector, and a data acquisition and processing module, wherein:

the first lens collimates light output by the visible light multi-core optical fiber and makes the light incident on the grating optical splitter in a form of a linear array; the grating optical splitter reflects the incident light at different angles according to different wavelengths, makes the reflected light pass through the second lens to form a plurality of light beams, and finally makes the light beams incident on the photodetector; the photodetector is an area array detector, and is a CMOS (complementary metal oxide semiconductor) or CCD (charge-coupled device) image sensor; and the data acquisition and processing module is configured for controlling exposure of the photodetector, acquiring an electrical signal output by the photodetector into a digital signal, and processing and storing the digital signal to obtain spectral information.

A method for detecting a subsurface defect of an optical component actually relies on the device for detecting the subsurface defect of the optical component above, and comprises the following steps of:

step 1: turning on a system power supply to preheat the wide-spectrum light source, the excitation laser device and the detection laser device for a period of time, so as to ensure spectrum distribution of the white light and frequency stabilities of the excitation laser and the detection laser;

step 2: setting a detection area and a detection range according to size information of the optical component to be detected;

step 3: controlling the motion platform to place the dispersion lens set above a certain detection position of the optical component to be detected;

step 4: controlling the 1×2 optical switch to gate a light source of the detection laser; and controlling the motion platform to move up and down to focus the detection laser on an upper surface of the optical component to be detected;

step 5: controlling the excitation laser device to generate the excitation laser, and inducing ultrasonic vibration at a focusing position of the excitation laser; and synchronously, recording propagation data of ultrasonic vibration to a surface through the laser interference detection device;

step 6: controlling the motion platform to step up and down; alternately gating the wide-spectrum light source and the light source of the detection laser by controlling the 1×2 optical switch at each stepping position; and respectively recording spectrum distribution information of reflected light output by each core of the visible light multi-core optical fiber at a current position through the spectrum detection device;

step 7: controlling the motion platform to move in a plane, and checking whether a detection is finished; and when the detection is not finished, moving the optical component to next detection position, carrying out related operations in the steps 3, 4, 5 and 6 above, and recording experimental data; and step 8: analyzing the recorded experimental data, calculating to acquire spatial information of the subsurface defect and identifying a type of the subsurface defect, and evaluating a degree of subsurface damage.

Further, in the method for detecting the subsurface defect of the optical component above, a specific method of focusing the detection laser on the upper surface of the optical component to be detected comprises: controlling the platform to move to keep the dispersion lens set far away from the optical component to be detected; stopping moving when the dispersion lens set is obviously far away from a focusing area; controlling the platform to move to make the dispersion lens set close to the optical component to be detected step by step, and recording spectrum distribution information of the central fiber core of the visible light multi-core optical fiber; analyzing spectrum distribution information corresponding to each position, finding a position with a maximum amplitude corresponding to the wavelength of the detection laser, and controlling the motion platform to move to the position; and controlling the 1×2 optical switch to gate the wide-spectrum light source, acquiring the spectrum distribution information of the central fiber core of the visible light multi-core optical fiber, calculating a wavelength corresponding to the position with the maximum amplitude, and calculating a difference between the wavelength and the wavelength of the detection laser, wherein when the difference is within ±15 microns, a focusing position is correct.

Further, in the method for detecting the subsurface defect of the optical component above, a specific method of calculating to acquire the spatial information of the subsurface defect comprises:

recording a number of fiber cores of the visible light multi-core optical fiber is as N, wherein N is an odd number, representing the fiber cores as $F_1$, $F_2$, $F_3$ . . . $F_n$, and recording the central fiber core of the visible light multi-core optical fiber as $F_m$;

carrying out correlation marking on the spectrum distribution information obtained in the step 6 with upper and lower positions and a fiber core serial number, and when the fiber core $F_n$ is located at a position z, recording spectrum distribution information of the detection laser corresponding to the light source of the detection laser as $S_{l(z,n)}$, and recording spectrum distribution information of white light dispersion corresponding to the wide-spectrum light source as $S_{w(z,n)}$;

respectively obtaining maximum amplitudes of $S_{l(z,n)}$ and $S_{w(z,n)}$ according to spatial arrangement information of each fiber core of the visible light optical fiber, and constructing an amplitude distribution diagram $I_{A-l(z)}$ of an optical field of the detection laser and an amplitude distribution diagram $I_{A-w(z)}$ of an optical field of the white light dispersion corresponding to the position z;

taking $S_{l(z,m)}$ and $S_{w(z,m)}$ corresponding to the central fiber core $F_m$ of the visible light multi-core optical fiber as benchmarks to obtain main component offsets of other fiber cores, and constructing a phase distribution diagram $I_{P-l(z)}$ of the optical field of the detection laser and a phase distribution diagram $I_{P-w(z)}$ of the optical field of the white light dispersion corresponding to the position z;

carrying out a difference operation on amplitude distribution diagrams $I_{A-l(z)}$ and $I_{A-l(z+\Delta z)}$ of optical fields of adjacent detection lasers in a height direction to construct a spatial gradient map $I_{G-l(z)}$ in the height direction; and carrying out a difference operation on amplitude distribution diagrams $I_{A-w(z)}$ and $I_{A-w(z+\Delta z)}$ of optical fields of adjacent white light dispersions in a height direction to construct a spatial gradient map $I_{G-w(z)}$ in the height direction;

carrying out spatial deconvolution on the amplitude distribution diagram $I_{A-l(z)}$ of the optical field of the detection laser and the amplitude distribution diagram $I_{A-w(z)}$ of the optical field of the white light dispersion, wherein a dependent convolution kernel is a mask image of Gaussian distribution, so as to obtain reflected light intensity amplitude diagrams $I_{Ap-l(z)}$ and $I_{Ap-w(z)}$ at the position z; and normalizing values of the obtained distribution diagrams $I_{P-l(z)}$, $I_{p-w(z)}$, $I_{G-l(z)}$ and $I_{G-w(z)}$ to (−1, +1); constructing a two-dimensional cross-sectional image of a micro-defect through a formula $I_{(z)} = \sigma I_{Ap-l(z)}(I_{P-l(z)}^2 + I_{G-l(z)}^2) + \rho I_{Ap-w(z)}(I_{P-w(z)}^2 + I_{G-w(z)}^2)$, wherein a value of σ is proportional to a reflection coefficient of the optical component to be detected to the detection laser, and a value of ρ is proportional to an absorption coefficient of the optical component to be detected to the excitation laser; and correspondingly arranging two-dimensional cross-sectional images in all height directions to obtain spatial three-dimensional information of the subsurface defect.

Further, in the method for detecting the subsurface defect of the optical component above, a specific method of identifying the type of the subsurface defect comprises:

using the two-dimensional cross-sectional image $I_{(z)}$, the phase distribution diagram $I_{P-l(z)}$ of the optical field of the detection laser and the phase distribution diagram $I_{P-w(z)}$ of the optical field of the white light dispersion obtained in the processes above as two-dimensional input images, using the propagation data of the ultrasonic vibration to the surface recorded in the step 5 above as a one-dimensional input signal, and carrying out small sample training through a Fast RCNN deep learning algorithm, so as to identify the type of the subsurface defect and realize damage characterization.

According to the device and method for detecting the subsurface defect of the optical component disclosed in the present invention, the excitation laser and the detection laser are simultaneously focused to different depths of the optical component through the dispersion lens set, the excitation laser induces the ultrasonic vibration on the subsurface of the optical component, the detection laser is used for observing and recording the ultrasonic vibration, and spatial distribution information and scattered spectral information of scattered light at a position of the subsurface defect are acquired by a spectral confocal technology. Multi-dimensional information such as a reflection spectrum, a scattering spectrum, a three-dimensional shape and a defect depth of the defect is obtained by utilizing the technologies above, and accurate detection of the subsurface defect is carried out.

Compared with the prior art, the present invention has the beneficial effects as follows:

firstly, in the present invention, the dispersion lens set is used to focus the detection laser and the excitation laser to different positions, so as to form a fixed path of laser ultrasonic propagation, which is beneficial for quantitative analysis of a ultrasonic vibration propagation process; secondly, in the present invention, based on a spectral confocal principle, optical field distribution diagrams of different depths are constructed, which can visually display the spatial information of the subsurface defect; and thirdly, the present invention provides multi-dimensional defect information, which is beneficial for accurate identification of a type of a defect.

DETAILED DESCRIPTION

The present invention will be described in detail hereinafter with reference to the drawings and the embodiments.

According to the present invention, a spectral confocal technology, a laser scattering technology and a laser-induced ultrasonic technology are combined, excitation laser and detection laser are simultaneously focused to different depths of an optical component through a dispersion lens set, the excitation laser generates a transient thermal expansion effect on a subsurface of the optical component, the detection laser is used for observing and analyzing ultrasonic vibration of the subsurface defect under an action of the thermal expansion effect, and spatial distribution information and scattered spectral information of scattered light at a position of the subsurface defect are acquired by the spectral confocal technology. Multi-dimensional information such as a reflection spectrum, a scattering spectrum, a three-dimensional shape and a defect depth of the defect is obtained by utilizing the technologies above, and damage characterization of the subsurface defect is carried out. The present invention is suitable for nondestructive testing of a finished product of an ultra-precise optical component with a strict requirement on the subsurface defect.

The embodiments of the present invention relate to a device and method for detecting a subsurface defect of an optical component, which may be used for detecting and evaluating the subsurface defect of the optical component. An embodiment provided by the present invention will be described hereinafter with reference to the drawings.

Figure 1:
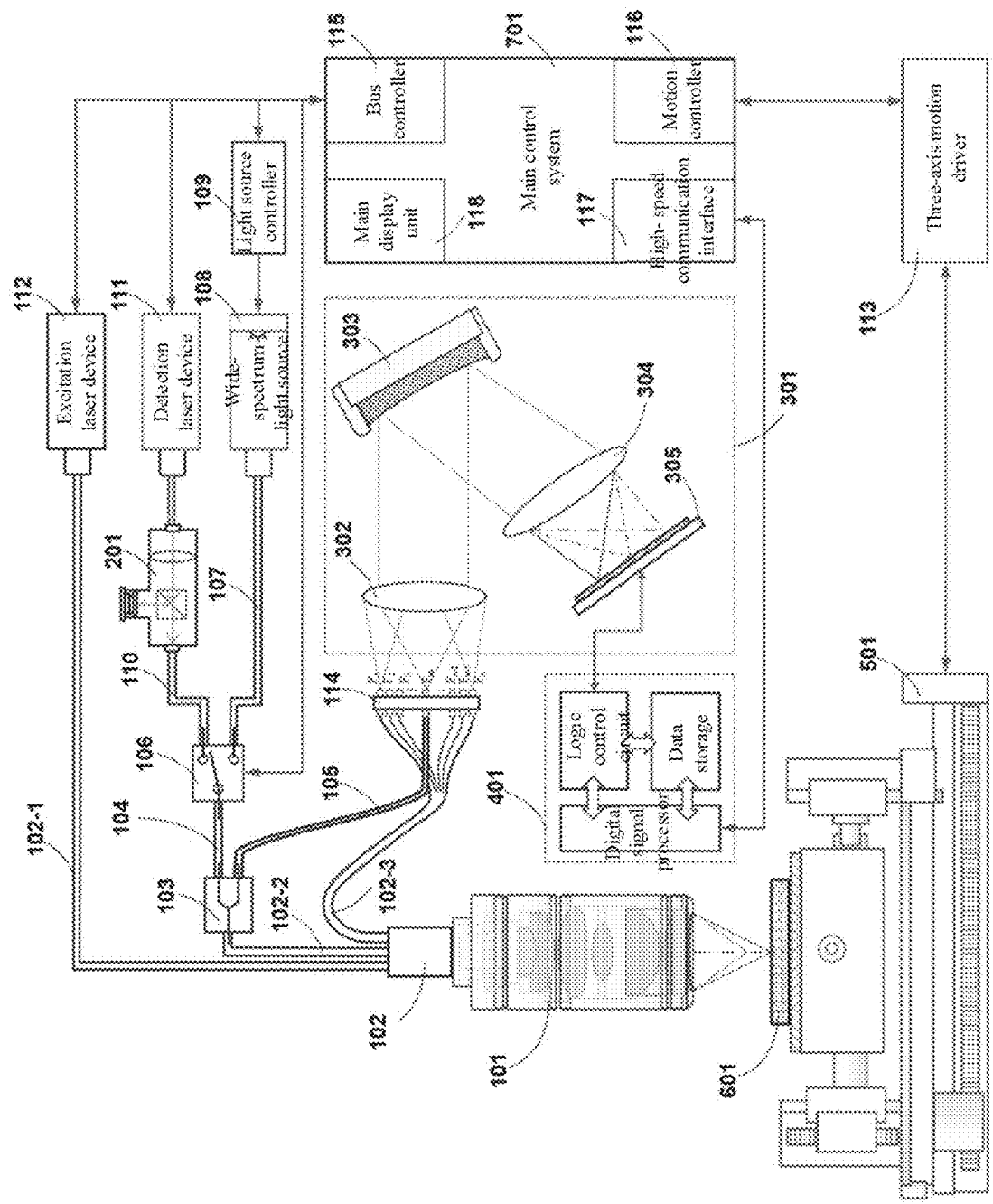
FIG. 1 is a schematic composition diagram of a device for detecting a subsurface defect of an optical component according to an embodiment of the present invention.

As shown in FIG. 1, a device for detecting according to an embodiment provided by the present invention comprises a wide-spectrum light source 108, an excitation laser device 112, a detection laser device 111, a dispersion lens set 101, a spectrum detection device 301, a laser interference detection device 201, an optical fiber optical path system, a motion platform 501 and a main control system 701.

In the embodiment, the wide-spectrum light source 108 generates white light, the excitation laser device 112 generates excitation laser, and the detection laser device 111 generates detection laser. The white light, the excitation laser and the detection laser are coupled into the dispersion lens set 101 through the optical fiber optical path system 102. The dispersion lens set 101 focuses the white light, the excitation laser and the detection laser to different depths of an optical component 601 to be detected. The spectrum detection device 301 is used for detecting spectrum distribution information of reflected light and scattered light. The excitation laser generates a transient thermal expansion effect on a subsurface of the optical component 601 to be detected. The laser interference detection device 201 is used for observing and recording ultrasonic vibration induced by the excitation laser, and composed of a Fabry-Perot resonator, a dichroic lens, an interference photoelectric detector and an interference signal sampler. The motion platform 501 is driven by a three-axis motion driver 113, and is capable of driving the optical component 601 to be detected to move in a three-dimensional space of X, Y and Z, and scanning and detecting a subsurface of a sample to be detected through the main control system 701.

In the embodiment, the wide-spectrum light source 108 used is a white light LED point light source used for generating continuous wide-spectrum white light. The excitation laser device 112 is a near infrared laser device, a wavelength of the excitation laser preferably ranges from 1,000 nanometers to 1,800 nanometers, and a time domain width of a minimum pulse is less than 1,000 picoseconds. The detection laser device 111 generates continuous detection laser, and a wavelength of the detection laser preferably ranges from 480 nanometers to 600 nanometers, and is most preferably 545 nanometers.

Figure 2:
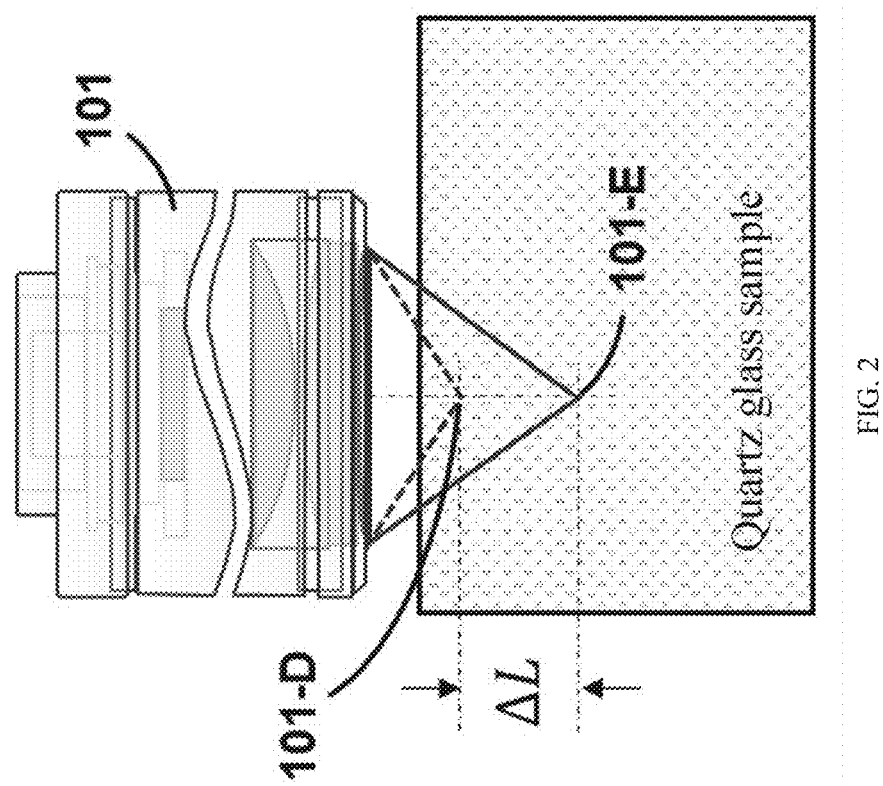
FIG. 2 is a schematic diagram of a dispersion lens set focusing excitation laser and detection laser respectively according to the embodiment of the present invention.

In the embodiment, the dispersion lens set 101 in the device is capable of respectively focusing polychromatic light and generating axial dispersion, with a numerical aperture larger than 0.6 and a magnification larger than 5. As shown in FIG. 2, in a quartz glass sample, the detection laser has an axial focusing position 101-D and the excitation laser has an axial focusing position 101-E through the dispersion lens set 101, and a distance $\Delta L$ between the axial focusing positions of the detection laser and the excitation laser preferably ranges from 90 microns to 150 microns, and most preferably $\Delta L=120$ microns.

In the embodiment, the optical fiber optical path system in the device comprises a dual-mode optical fiber 102, a Y-shaped optical fiber coupler 103, a 1×2 optical switch 106, a first visible light optical fiber 104, a second visible light optical fiber 107, a third visible light optical fiber 110, a fourth visible light optical fiber 105 and an optical fiber beam collector 114.

Figure 3:
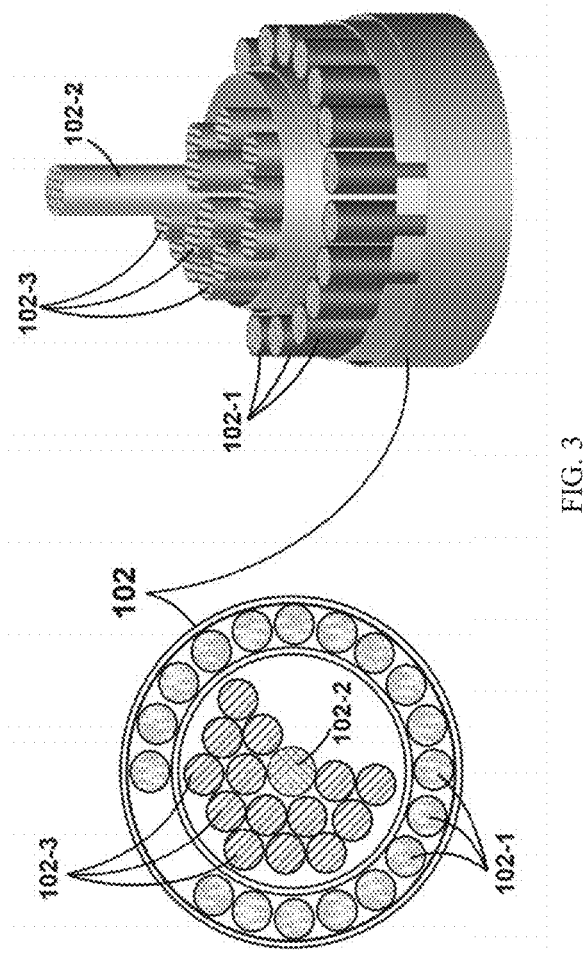
FIG. 3 is a schematic diagram of a structural layout of a multi-mode optical fiber according to the embodiment of the present invention.

As shown in FIG. 3, in the embodiment, the dual-mode optical fiber 102 is designed to be composed of an infrared annular multi-core optical fiber 102-1 and a visible light multi-core optical fiber, and the infrared multi-core optical fiber 102-1 surrounds on an outer side of the visible light multi-core optical fiber. The visible light multi-core optical fiber is provided with an odd number of fiber cores, a central fiber core 102-2 is located in a geometric center of the visible light multi-core optical fiber, and a diameter of the central fiber core is more than three times that of other fiber cores 102-3.

In the embodiment, the 1×2 optical switch 106 is provided with three ports comprising a port P1, a port P2 and a port P3, which are respectively connected with one ends of the first visible light optical fiber 104, the second visible light optical fiber 107 and the third visible light optical fiber 110, and the port P1 is only communicated with one of the port P2 and the port P3 at the same time. The Y-shaped optical fiber coupler 103 is provided with three ports comprising a light inlet, a light outlet and a coupling port. The other end of the first visible light optical fiber 104 is connected to the light inlet of the Y-shaped optical fiber coupler 103. One end of the fourth visible light optical fiber 105 is connected to the light outlet of the Y-shaped optical fiber coupler 103, and the other end of the fourth visible light optical fiber is connected to an intermediate node F. of the optical fiber beam collector 114. The central fiber core 102-2 of the visible light multi-core optical fiber is connected to the coupling port of the Y-shaped optical fiber coupler 103. The white light generated by the wide-spectrum light source 108 enters the port P2 of the 1×2 optical switch 106 through the second visible light optical fiber 107. The detection laser generated by the detection laser device 111 passes through the laser interference detection device 201 and then enters the port P3 of the 1×2 optical switch 106 through the third visible light optical fiber 110. The optical fiber beam collector 114 is provided with an odd number of nodes arranged in a linear array, wherein the number of nodes is the same as the number of cores of the visible light multi-core optical fiber, and used for collecting the fiber cores of the visible light multi-core optical fiber into the linear array.

In the embodiment, the spectrum detection device 301 in the device comprises a first lens 302, a second lens 304, a grating optical splitter 303, a photodetector 305, and a data acquisition and processing module 401.

The first lens 302 collimates light output by the visible light multi-core optical fibers 102-2 and 102-3, and makes the light incident on the grating optical splitter 303 in a form of a linear array. The grating optical splitter 303 reflects the incident light at different angles according to different wavelengths, makes the reflected light pass through the second lens 304 to form a plurality of light beams, and finally makes the light beams incident on the photodetector 305. The photodetector 305 is an area array detector, and may be a CMOS (complementary metal oxide semiconductor) or CCD (charge-coupled device) image sensor. The data acquisition and processing module 401 is configured for controlling exposure of the photodetector 305, acquiring an electrical signal output by the photodetector 305 into a digital signal, and processing and storing the digital signal to obtain spectral information.

Figure 4:
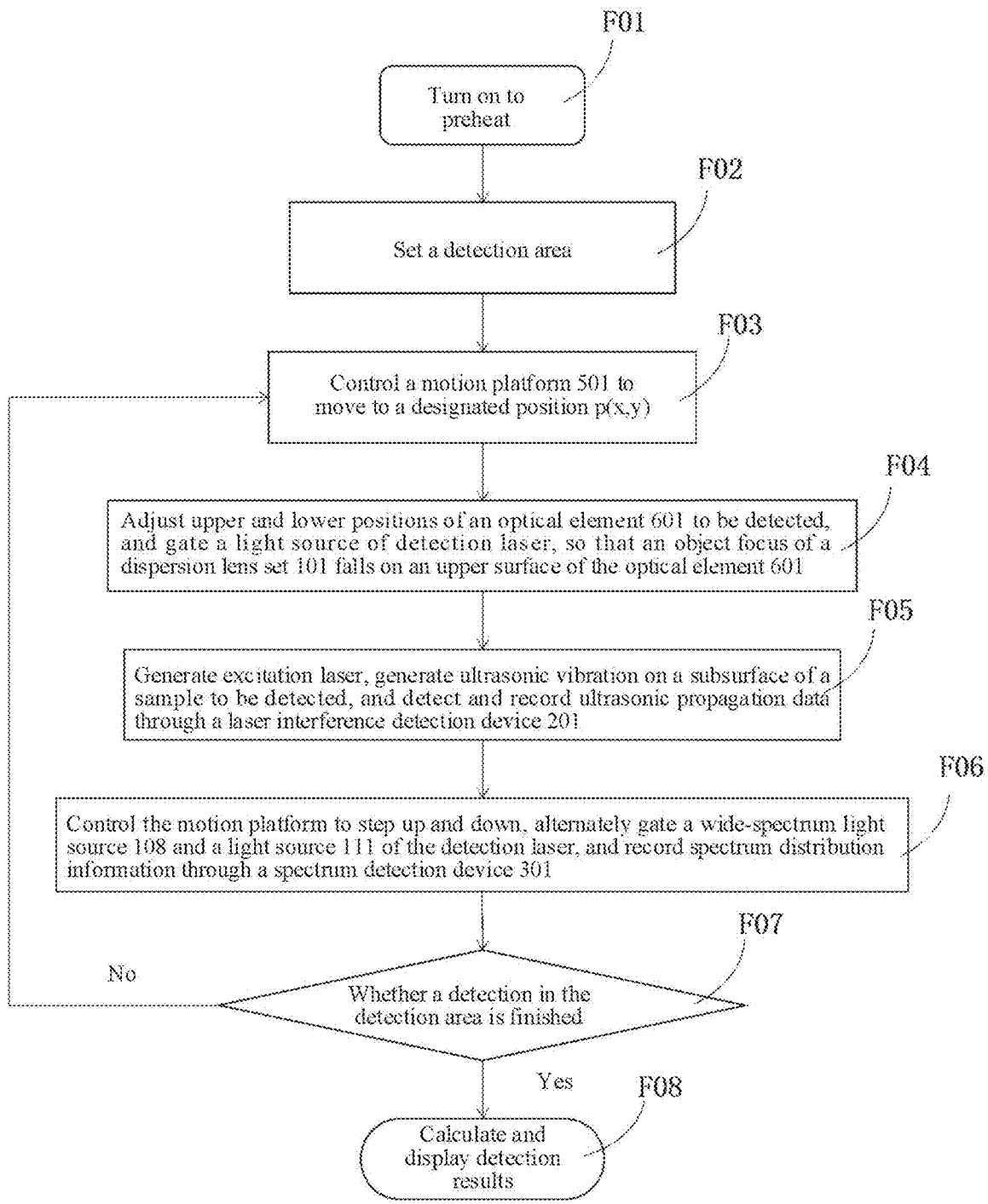
FIG. 4 is a flow chart of a method used in the device for detecting the subsurface defect of the optical component according to the embodiment of the present invention.

A method for detecting a subsurface defect of an optical component actually relies on the device for detecting the subsurface defect of the optical component above, with a flow as shown in FIG. 4, and comprises the following steps of:

F01: turning on a system power supply to preheat the wide-spectrum light source 108, the excitation laser device 112 and the detection laser device 111 for a period of time, so as to ensure spectrum distribution of the white light and frequency stabilities of the excitation laser and the detection laser;

F02: setting a detection area and a detection range according to size information of the optical component 601 to be detected;

F03: controlling the motion platform 501 to place the dispersion lens set 101 above a designated detection position of the optical component 601 to be detected;

F04: controlling the 1×2 optical switch 106 to gate a light source of the detection laser; and controlling the motion platform 501 to move up and down to focus the detection laser on an upper surface of the optical component 601 to be detected;

F05: controlling the excitation laser device 112 to generate the excitation laser, and inducing ultrasonic vibration at a focusing position of the excitation laser; and synchronously, recording propagation data of ultrasonic vibration to a surface through the laser interference detection device 201;

F06: controlling the motion platform 501 to step up and down; alternately gating the wide-spectrum light source 108 and the light source of the detection laser by controlling the 1×2 optical switch 106 at each stepping position; and respectively recording spectrum distribution information of reflected light output by each core of the visible light multi-core optical fiber at a current position through the spectrum detection device 301;

F07: controlling the motion platform 501 to move in a plane, and checking whether a detection is finished; and when the detection is not finished, moving the optical component to next designated detection position, carrying out related operations in the steps 3, 4, 5 and 6 above, and recording experimental data; and F08: analyzing the recorded experimental data, calculating to acquire spatial information of the subsurface defect and identifying a type of the subsurface defect, and evaluating a degree of subsurface damage.

In the embodiment, in the method for detecting the subsurface defect of the optical component, a specific method of focusing the detection laser on the upper surface of the optical component to be detected comprises:

controlling the platform 501 to move to keep the dispersion lens set 101 far away from the optical component 601 to be detected; stopping moving when the dispersion lens set 101 is obviously far away from a focusing area; controlling the platform 501 to move to make the dispersion lens set 101 close to the optical component 601 to be detected step by step, and recording spectrum distribution information of the central fiber core 102-2 of the visible light multi-core optical fiber; analyzing spectrum distribution information corresponding to each position, finding a position with a maximum amplitude corresponding to the wavelength of the detection laser, and controlling the motion platform 501 to move to the position; and controlling the 1×2 optical switch 106 to gate the wide-spectrum light source 108, acquiring the spectrum distribution information of the central fiber core 102-2 of the visible light multi-core optical fiber, calculating a wavelength corresponding to the position with the maximum amplitude, and calculating a difference between the wavelength and the wavelength of the detection laser, wherein when the difference is within ±15 microns, a focusing position is correct.

Figure 5:
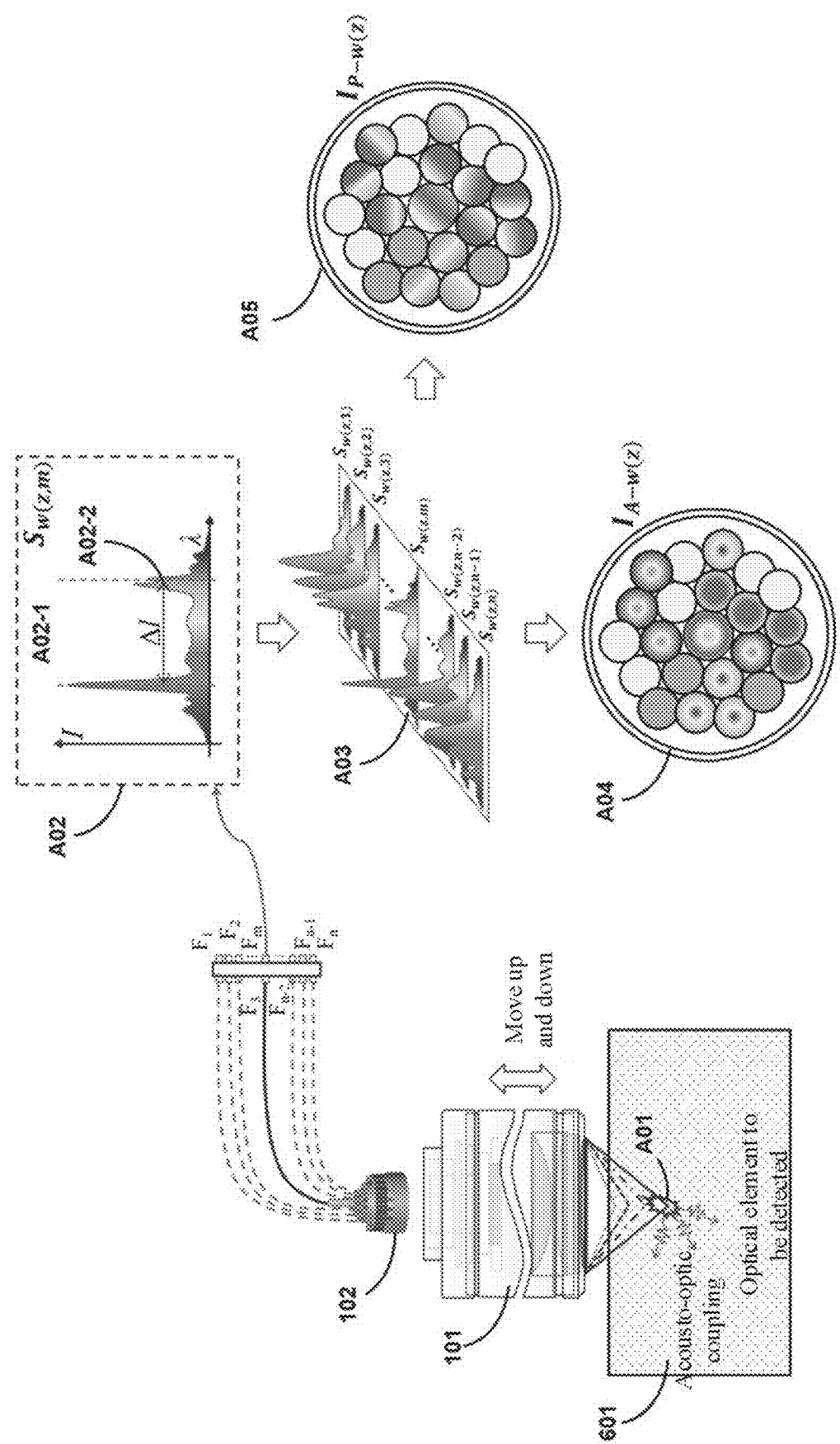
FIG. 5 is a schematic diagram of acquiring spectrum spatial distribution information of white light dispersion according to the embodiment of the present invention.
Figure 6:
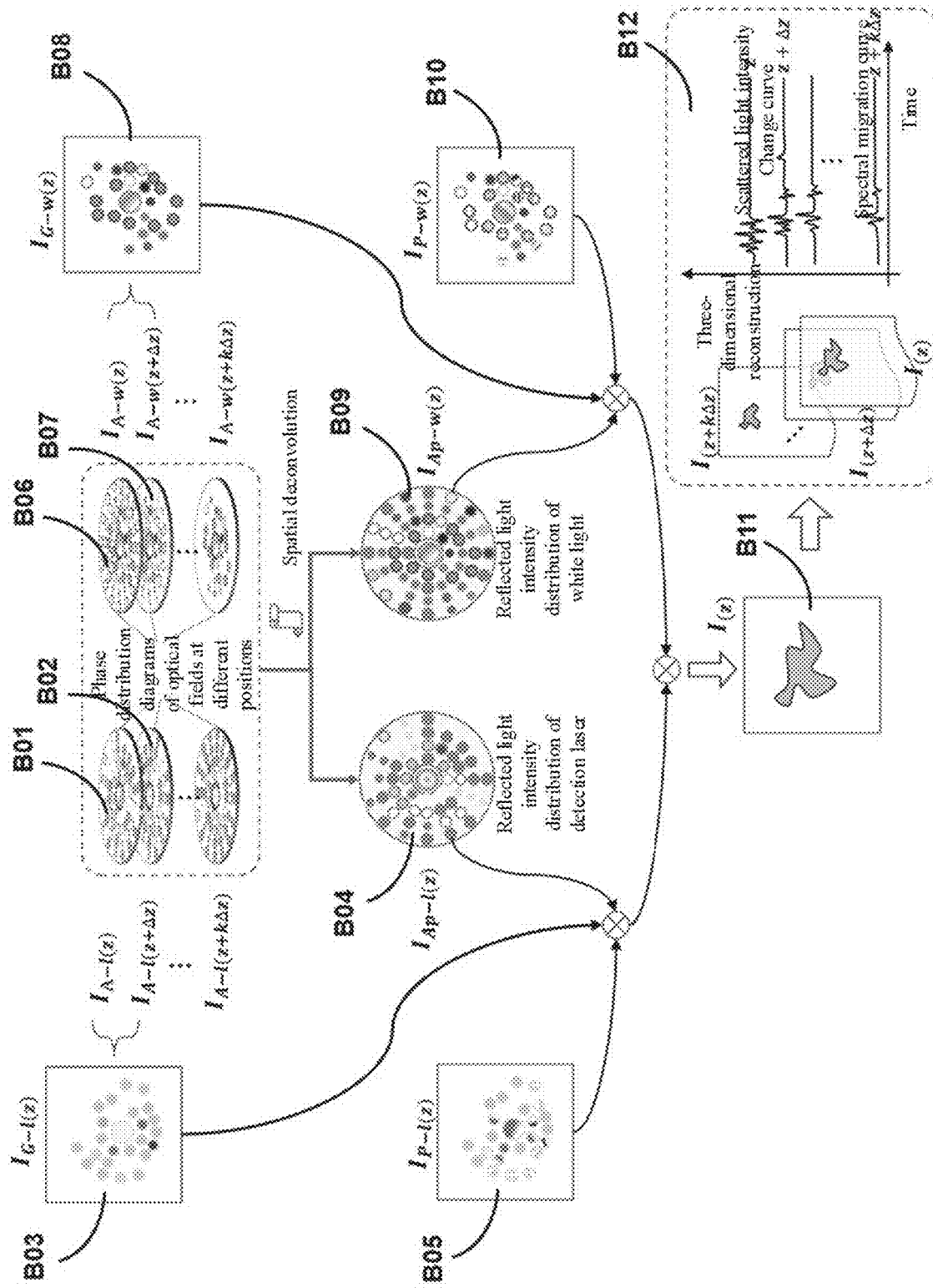
FIG. 6 is a schematic diagram of a method of calculating to obtain spatial information of a subsurface defect according to the embodiment of the present invention.

In the embodiment, in the method for detecting the subsurface defect of the optical component, a specific method of calculating to acquire the spatial information of the subsurface defect is as shown in FIG. 5 and FIG. 6.

A number of fiber cores of the visible light multi-core optical fiber is recorded as N, wherein N is an odd number, the fiber cores are represented as $F_1, F_2, F_3 \ldots F_n$, and the central fiber core of the visible light multi-core optical fiber is recorded as $F_m$.

Correlation marking is carried out on the spectrum distribution information obtained in the step F06 with upper and lower positions and a fiber core serial number, and when the fiber core $F_n$ is located at a position z, spectrum distribution information of the detection laser corresponding to the light source of the detection laser is recorded as $S_{l(z,n)}$, and spectrum distribution information of white light dispersion corresponding to the wide-spectrum light source is recorded as $S_{W(z,n)}$.

As shown in FIG. 5, the spectrum distribution information of the white light dispersion of each fiber core of the visible light optical fiber is recorded as A03, and a maximum amplitude of $S_{w(z,n)}$ is obtained. An optical spectrum A02 of the white light dispersion of the central fiber core $F_m$ of the visible light multi-core optical fiber at the position z is marked as $S_{w(z,m)}$, and main components of a frequency spectrum of the optical spectrum are composed of peaks A02-1 and A02-2. According to spatial arrangement information of the fiber cores of the visible light optical fiber, the maximum amplitudes above are correspondingly arranged to form an amplitude distribution diagram $I_{A-w(z)}$ of an optical field of the white light dispersion recorded as A04. $S_{w(z,m)}$ corresponding to the central fiber core $F_m$ of the visible light multi-core optical fiber is taken as a benchmark to obtain main component offsets of other fiber cores, and a phase distribution diagram $I_{P-w(z)}$ of the optical field of the white light dispersion recorded as A05 corresponding to the position z is constructed. An amplitude distribution diagram $I_{A-l(z)}$ of the optical field of the detection laser and a phase distribution diagram $I_{P-l(z)}$ of the optical field of the detection laser corresponding to the position z are constructed in the same way.

As shown in FIG. 6, at two adjacent recording positions z and z+Δz in a height direction, a difference operation is carried out on the amplitude distribution diagram $I_{A-l(z)}$ of the optical field of the detection laser recorded as B01 at the position z and the amplitude distribution diagram $I_{A-l(z+\Delta z)}$ of the optical field of the detection laser recorded as B02 at the position z+Δz, and a spatial gradient map $I_{G-l(z)}$ recorded as B03 in the height direction is constructed. A difference operation is carried out on amplitude distribution diagrams $I_{A-w(z)}$ and $I_{A-w(z+\Delta z)}$ (which are namely B06 and B07 in the drawing) of optical fields of adjacent white light dispersions in a height direction to construct a spatial gradient map $I_{G-w(z)}$ recorded as B08 in the height direction.

As shown in FIG. 6, spatial deconvolution is carried out on the amplitude distribution diagram $I_{A-l(z)}$ of the optical field of the detection laser recorded as B04 and the amplitude distribution diagram $I_{A-w(z)}$ of the optical field of the white light dispersion recorded as B05, wherein a dependent convolution kernel is a mask image of Gaussian distribution, so as to obtain a reflected light intensity amplitude diagram $I_{Ap-l(z)}$ of the detection laser recorded as B04 and a reflected light intensity amplitude diagram $I_{Ap-w(z)}$ of the white light recorded as B09 at the position z.

Values of the distribution diagrams $I_{P-l(z)}$, $I_{P-w(z)}$, $I_{G-l(z)}$ and $I_{G-w(z)}$ obtained in the steps above are normalized to (−1, +1). A two-dimensional cross-sectional image B11 of a micro-defect is constructed by using B03, B04, B05, B08, B09 and B10 in FIG. 6 through a formula $I_{(z)}=\sigma I_{Ap-l(z)} (I_{P-l(z)}^2+I_{G-l(z)}^2)+\rho I_{Ap-w(z)}(I_{P-w(z)}^2+I_{G-w(z)}^2)$, wherein a value of a is proportional to a reflection coefficient of the optical component to be detected to the detection laser, and a value of ρ is proportional to an absorption coefficient of the optical component to be detected to the excitation laser. Two-dimensional cross-sectional images in all height directions are correspondingly arranged to obtain spatial three-dimensional information B12 of the subsurface defect.

In the embodiment, in the method for detecting the subsurface defect of the optical component above, a specific method of identifying the type of the subsurface defect comprises:

using the two-dimensional cross-sectional image $I_{(z)}$ recorded as B11, the phase distribution diagram $I_{P-l(z)}$ of the optical field of the detection laser recorded as B05 and the phase distribution diagram $I_{P-w(z)}$ of the optical field of the white light dispersion recorded as B10 obtained in the processes above as two-dimensional input images, using the propagation data of the ultrasonic vibration to the surface recorded in the step F05 above as a one-dimensional input signal, and carrying out small sample training through a Fast RCNN deep learning algorithm, so as to identify the type of the subsurface defect and realize damage characterization.

The above embodiment is only a preferred solution of the present invention, and is not intended to limit the present invention. Those of ordinary skills in the related technical field can further make various changes and modifications without departing from the spirit and scope of the present invention. Therefore, all technical solutions obtained by equivalent substitution or equivalent transformation fall within the scope of protection of the present invention.

The invention claimed is:

1. A device for detecting a subsurface defect of an optical component, comprising a wide-spectrum light source, a near-infrared laser (NIR laser), a detection laser device, a dispersion lens set, a spectrum detector, a laser interferometer, an optical fiber optical path system, a motion platform, and a main control system, wherein:

the wide-spectrum light source is configured for generating white light, the near infrared laser is configured for generating generates excitation laser light, and the detection laser device is configured for generating detection laser light; wherein the detection laser light is a laser light for detection;

the white light, the excitation laser light and the detection laser light are coupled into the dispersion lens set through the optical fiber optical path system;

the dispersion lens set focuses the white light, the excitation laser light and the detection laser light to different depths of the optical component;

the excitation laser light generates a transient thermal expansion effect on a subsurface of the optical component and induces ultrasonic vibration;

the laser interferometer is used for observing and recording the ultrasonic vibration induced by the excitation laser light, and the laser interferometer is composed of a Fabry-Perot resonator, a dichroic lens, an interference photoelectric detector and an interference signal sampler;

the spectrum detector is configured for detecting spectrum distribution information of reflected light and scattered light; the spectrum detector comprises a first lens, a second lens, a grating optical splitter, a photodetector, and a data acquisition and processing module; the first lens collimates light output by the visible light multi-core optical fiber and makes the light incident on the grating optical splitter in a form of a linear array; the grating optical splitter reflects the incident light at different angles according to different wavelengths, makes the reflected light pass through the second lens to form a plurality of light beams, and finally makes the light beams incident on the photodetector; the photodetector is an area array detector, and is a CMOS or CCD image sensor; and the data acquisition and processing module is configured for controlling exposure of the photodetector, acquiring an electrical signal output by the photodetector into a digital signal, and processing and storing the digital signal to obtain spectral information;

the detection laser device is a laser capable of generating continuous detection laser light and a wavelength of the detection laser light ranges from 480 nanometers to 600 nanometers;

the motion platform is capable of driving the optical component to be detected or the dispersion lens set to move in a three-dimensional space of X, Y and Z, and scanning and detecting a surface and a subsurface of a sample to be detected through the main control system;

the optical fiber optical path system comprises a dual-mode optical fiber, a Y-shaped optical fiber coupler, a 1×2 optical switch, a first visible light optical fiber, a second visible light optical fiber, a third visible light optical fiber, a fourth visible light optical fiber and an optical fiber beam collector;

the dual-mode optical fiber is composed of an infrared annular multi-core optical fiber and a visible light multi-core optical fiber, with a cross section in a circular shape; the infrared multi-core optical fiber surrounds on an outer side of the visible light multi-core optical fiber; and the visible light multi-core optical fiber is provided with an odd number of fiber cores, a central fiber core is located in a geometric center of the visible light multi-core optical fiber, and a diameter of the central fiber core is more than three times that of other fiber cores;

the 1×2 optical switch is provided with three ports comprising a port P1, a port P2 and a port P3, which are respectively connected with one ends of the first visible light optical fiber, the second visible light optical fiber and the third visible light optical fiber, and the port P1 is only communicated with one of the port P2 and the port P3 at the same time;

the Y-shaped optical fiber coupler is provided with three ports comprising a light inlet, a light outlet and a coupling port; the other end of the first visible light optical fiber is connected to the light inlet of the Y-shaped optical fiber coupler; one end of the fourth visible light optical fiber is connected to the light outlet of the Y-shaped optical fiber coupler, and the other end of the fourth visible light optical fiber is connected to an intermediate node of the optical fiber beam collector; and the central fiber core of the visible light multi-core optical fiber is connected to the coupling port of the Y-shaped optical fiber coupler;

the white light generated by the wide-spectrum light source enters the port P2 of the 1×2 optical switch through the second visible light optical fiber;

the detection laser light generated by the detection laser device passes through the laser interferometer and then enters the port P3 of the 1×2 optical switch through the third visible light optical fiber;

the optical fiber beam collector is provided with an odd number of nodes arranged in a linear array, wherein the number of nodes is the same as the number of cores of the visible light multi-core optical fiber, and used for collecting the fiber cores of the visible light multi-core optical fiber into the linear array;

the main control system comprises a display, a bus controller, a communication interface, and a motion controller; the bus controller is connected to the wide-spectrum light source, the near-infrared laser, the detection laser device, the 1×2 optical switch, respectively; the motion controller is connected to the motion platform; the communication interface is connected to the data acquisition and processing module;

the data acquisition and processing comprises a logic control circuit, a digital signal processor, and a data memory; the logic control circuit is configured for acquiring the electrical signal output by the photodetector; the digital signal processor is configured for converting the electrical signal into the digital signal, and processing the digital signal to obtain spectral information; the data memory is configured for storing the digital signal to obtain spectral information.

2. The device for detecting the subsurface defect of the optical component according to claim 1, wherein:

the dispersion lens set is capable of respectively focusing polychromatic light and generating axial dispersion, with a numerical aperture larger than 0.6; and through the dispersion lens set, the detection laser light and the excitation laser light are respectively focused at different axial positions, and a distance between the axial positions of the detection laser light and the excitation laser light ranges from 90 microns to 150 microns.

3. The device for detecting the subsurface defect of the optical component according to claim 2, wherein the distance between the axial positions of the detection laser light and the excitation laser light is 120 microns.

4. The device for detecting the subsurface defect of the optical component according to claim 1, wherein the wide-spectrum light source is a white light LED point light source, which generates continuous wide-spectrum white light; a wavelength of the excitation laser light preferably ranges from 1,000 nanometers to 1,800 nanometers, and a time domain width of a minimum pulse is less than 1,000 picoseconds.

5. The device for detecting the subsurface defect of the optical component according to claim 1, wherein a detection method of the device specifically comprises the following steps of:

step 1: turning on a system power supply to preheat the wide-spectrum light source, the near-infrared laser and the detection laser device for a period of time, so as to ensure spectrum distribution of the white light and frequency stabilities of the excitation laser light and the detection laser light;

step 2: setting a detection area according to size information of the optical component to be detected;

step 3: controlling the motion platform to place the dispersion lens set above a designated detection position of the optical component to be detected;

step 4: controlling the 1×2 optical switch to gate a light source of the detection laser light; and controlling the motion platform to move up and down to focus the detection laser light on an upper surface of the optical component to be detected;

step 5: controlling the near-infrared laser to generate the excitation laser light, and inducing ultrasonic vibration at a focusing position of the excitation laser light; and synchronously, recording propagation data of ultrasonic vibration to a surface through the laser interferometer;

step 6: controlling the motion platform to step up and down; alternately gating the wide-spectrum light source and the light source of the detection laser light by controlling the 1×2 optical switch at each stepping position; and respectively recording spectrum distribution information of reflected light output by each core of the visible light multi-core optical fiber at a current position through the spectrum detector;

step 7: controlling the motion platform to move in a plane, and checking whether a detection in the detection area is finished; and when the detection is not finished, moving the optical component to next designated detection position, carrying out related operations in the steps 3, 4, 5 and 6 above, and recording experimental data; and step 8: calculating to acquire spatial information of the subsurface defect and identifying a type of the subsurface defect according to the recorded experimental data, and obtaining a degree of subsurface damage.

6. The device for detecting the subsurface defect of the optical component according to claim 5, wherein in the detection method of the device, a specific method of the step 4 of focusing the detection laser light on the upper surface of the optical component to be detected comprises: controlling the platform to move to keep the dispersion lens set far away from the optical component to be detected; stopping moving when the dispersion lens set is obviously far away from a focusing area; controlling the platform to move to make the dispersion lens set close to the optical component to be detected step by step, and recording spectrum distribution information of the central fiber core of the visible light multi-core optical fiber; analyzing spectrum distribution information corresponding to each position, finding a position with a maximum amplitude corresponding to the wavelength of the detection laser light, and controlling the motion platform to move to the position; and controlling the 1×2 optical switch to gate the wide-spectrum light source, acquiring the spectrum distribution information of the central fiber core of the visible light multi-core optical fiber, calculating a wavelength corresponding to the position with the maximum amplitude, and calculating a difference between the wavelength and the wavelength of the detection laser light, wherein when the difference is within ±15 microns, a focusing position is correct.

\* \* \* \* \*